United States Patent [19]
Giacomini

[11] Patent Number: 5,094,261
[45] Date of Patent: Mar. 10, 1992

[54] NON-RETURN VALVE

[75] Inventor: Marco Giacomini, S. Maurizio d'Opaglio, Italy

[73] Assignee: Sirio S.p.A., S. Maurizio d'Opaglio, Italy

[21] Appl. No.: 676,200

[22] Filed: Mar. 27, 1991

[30] Foreign Application Priority Data

Oct. 5, 1990 [IT] Italy ............................. 21640 A/90

[51] Int. Cl.⁵ ............................................ F16K 24/00
[52] U.S. Cl. .................................... 137/107; 137/218; 137/859
[58] Field of Search ............... 137/107, 216, 217, 218, 137/512, 512.3, 517, 859

[56] References Cited

U.S. PATENT DOCUMENTS 3,065,761 11/1962 Peras ................................. 137/107
3,952,766 4/1976 Johnson .

*Primary Examiner*—Alan Cohan
*Attorney, Agent, or Firm*—Darby & Darby

[57] ABSTRACT

Non-return valve, in which, between the non-return valve assembly and the end of the valve body, which can be connected to a tap, emptying ports are provided and a shut-off diaphragm is supported, which, when the tap is closed, frees the run between the inside of the tap and the emptying ports and, when the tap is open, separates the inside of the tap from the emptying ports.

5 Claims, 3 Drawing Sheets

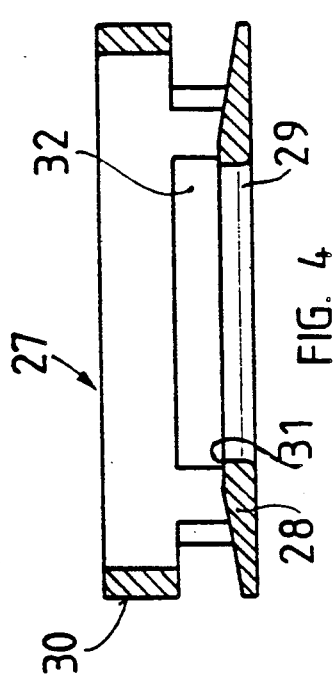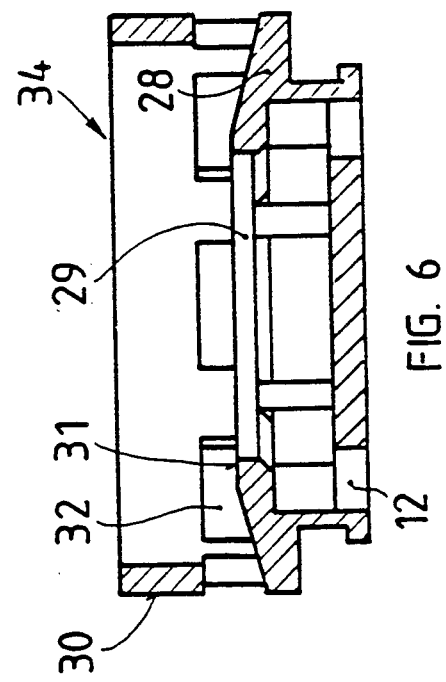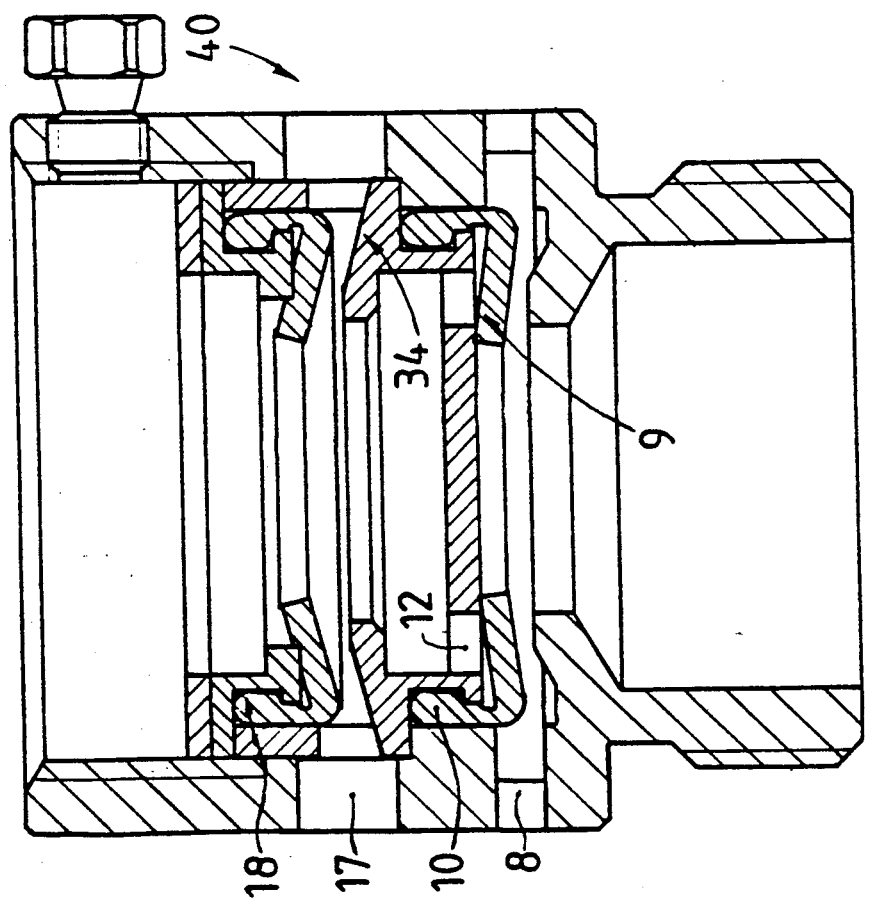

NON-RETURN VALVE

DESCRIPTION OF THE INVENTION

The present invention relates to a non-return valve comprising a valve body with an end which can be connected to a tap and an end which can be connected to the consumer pipe, as well as a non-return valve assembly which interacts with discharge openings in the valve body.

Aside from the design of the non-return valve assembly, known non-return valves do not permit emptying of the water contained inside the tap, after closing of the tap. This constitutes a serious limitation of known non-return valves which are generally mounted on outside taps. These taps pass through the entire thickness of the wall, for example of the house or of a garage, and have on the outside the control hand-grip and the connector of the non-return valve, for example for connection to a hose. These taps are therefore exposed to the action of frost. Freezing of the water inside the taps would involve damage and breakage of the same.

The aim of the invention is to indicate a non-return valve which makes possible, after closing of the tap, an automatic discharge of the water situated inside the tap.

This aim is achieved, according to the invention, by means of a non-return valve for taps, comprising a valve body with, between the inlet end and the outlet end, a non-return valve which can be connected to the consumer pipe, which is characterised in that, between the inlet end and the non-return valve, in the valve body, a shut-off valve is accommodated and circumferentially distributed emptying ports are provided, in that the shut-off valve comprises a flexible shut-off diaphragm, of transverse section in the form of an L or V with a tubular leg, which is accommodated in a support with circumferential ports, and a radial flexible flange which bears against an annular stop, in that the radial flange forms with a collar downstream an annular channel which connects the internal chamber of the valve body to the emptying ports, and in that the radial flange is movable, in opposition to its own elasticity, against the collar by the flow delivered and shuts off the annular channel.

A valve is produced of limited axial extension and with a limited number of components, which can be assembled easily, by virtue of the fact that the support of the shut-off diaphragm comprises an internal cup-type support and an external cup-type support, accommodated in the valve body, and that the support leg of the shut-off diaphragm has a circumferential thickening which can be accommodated between a seat provided in the internal cup-type support and the jacket of the external cup-type support.

It is possible to reduce further the number of components of the valve according to the invention by providing an elastic diaphragm of transverse section in the form of an L or V for the non-return valve assembly also and by virtue of the fact that the external cup-type support of the elastic shut-off diaphragm and the internal cup-type support of the diaphragm of the non-return valve assembly are made in one single piece.

The advantages achieved with the invention consist above all in the fact that an automatic discharge is obtained of the water of the closed tap by directly incorporating a shut-off valve into the body of a non-return valve of any design. The valve according to the invention has a small space requirement and can be made with an extremely limited number of mutually concentric components, that is to say they permit assembly which can be automated. Two illustrative embodiments of the invention are illustrated in the drawings and are described in greater detail below. In the drawings, FIG. 1 shows a central vertical section along an outside tap with a connector for a non-return valve;

FIG. 4 shows a transverse section through the external cup-type support of the shut-off diaphragm;

FIG. 5 shows a longitudinal section through an alternative of the valve according to the invention, with the tap in closed position;

FIG. 6 shows a section through a support of the two diaphragms of the valve in FIG. 5.

Figure 1:
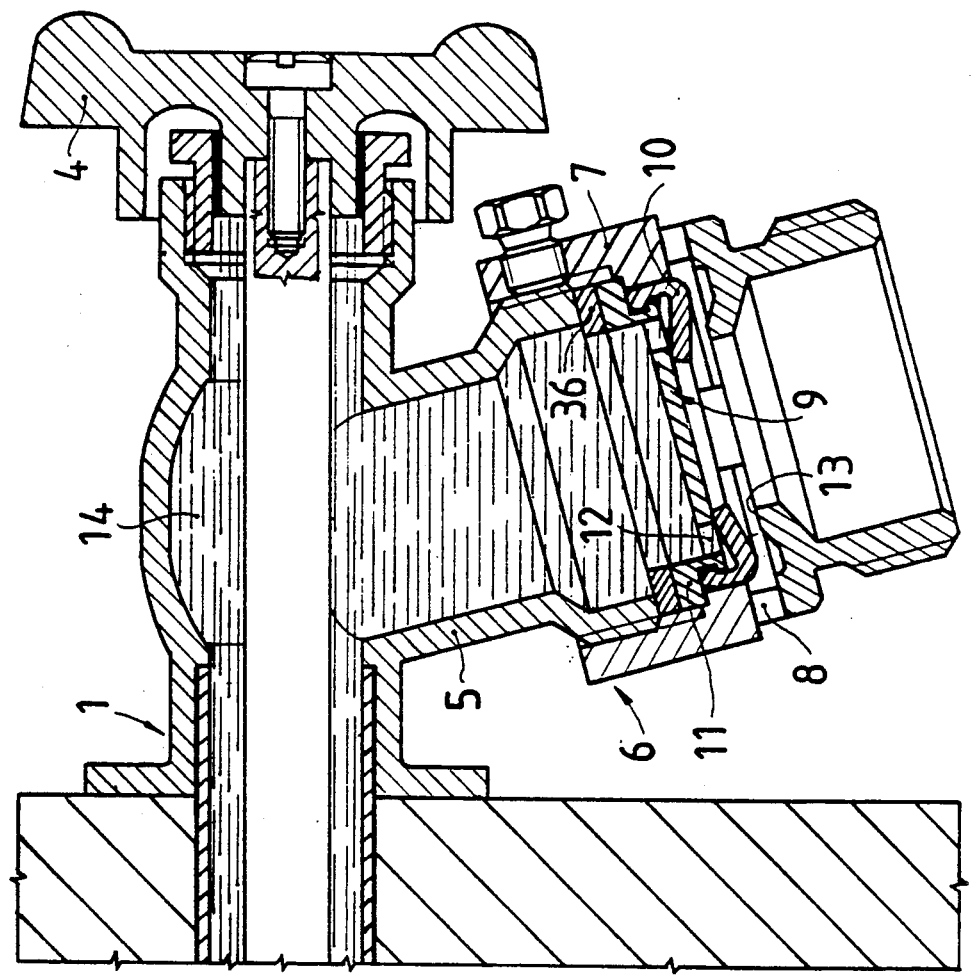

In FIG. 1, an outside tap 1 is represented, mounted in a wall 2 which is illustrated in a discontinuous manner. The tap 1 is provided with an obturator 3 on the internal side of the wall 2. On the external side of the wall 2, the tap 1 has a control hand-grip 4 and a threaded mouth 5, to which a non-return valve 6 can be screwed. In the example illustrated, the non-return valve 6 comprises a body 7 with peripheral discharge ports 8. In the body 7 of the valve, a non-return valve assembly 9 is accommodated, which comprises an elastic non-return diaphragm 10 accommodated in a cup-type support 11 which is provided on the bottom with circumferentially distributed ports 12. 13 indicates an annular shoulder formed in the body 7 of the valve. Between the cup-type support 11 and the mouth 5 for connection of the tap 1, a gasket 36 is inserted.

In known non-return valves of any design, it occurs that, with the tap 1 closed, all the water contained in the internal chamber 14 of the tap and of the connection mouth 5 remains contained in the tap and is subject to frost.

Figure 3:
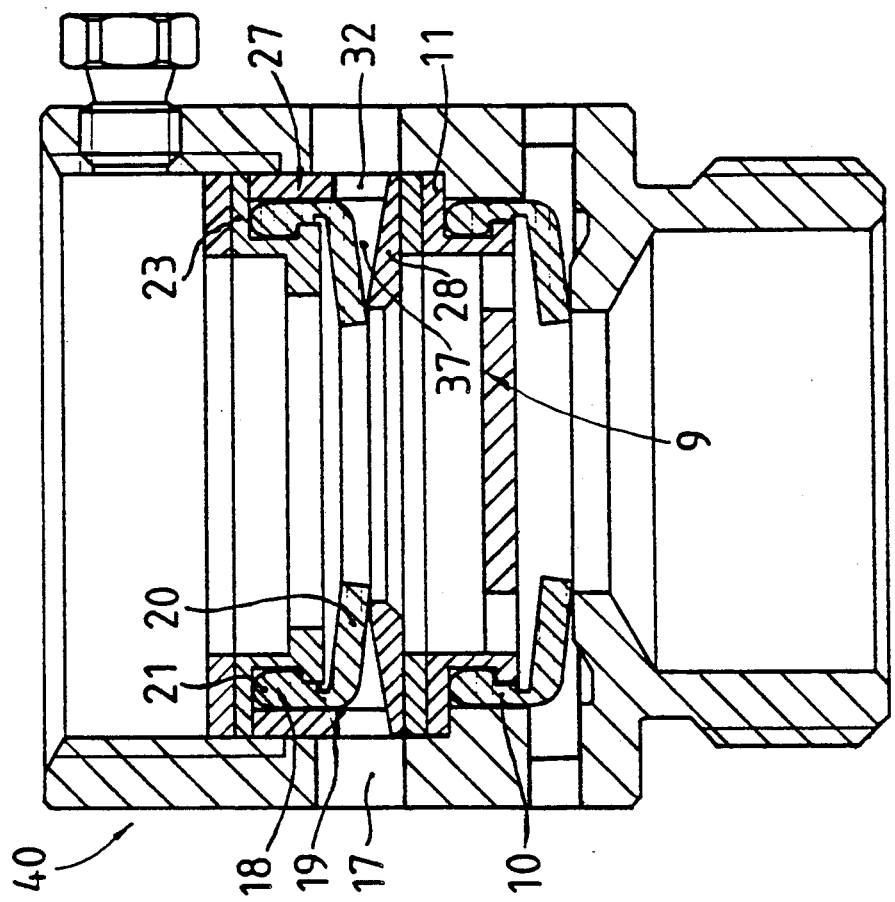
FIGS. 2 and 3 show a central section through a non-return valve according to the invention, and more specifically in FIG. 2 in the position with the tap closed and in FIG. 3 in the position with the tap open.
Figure 2:
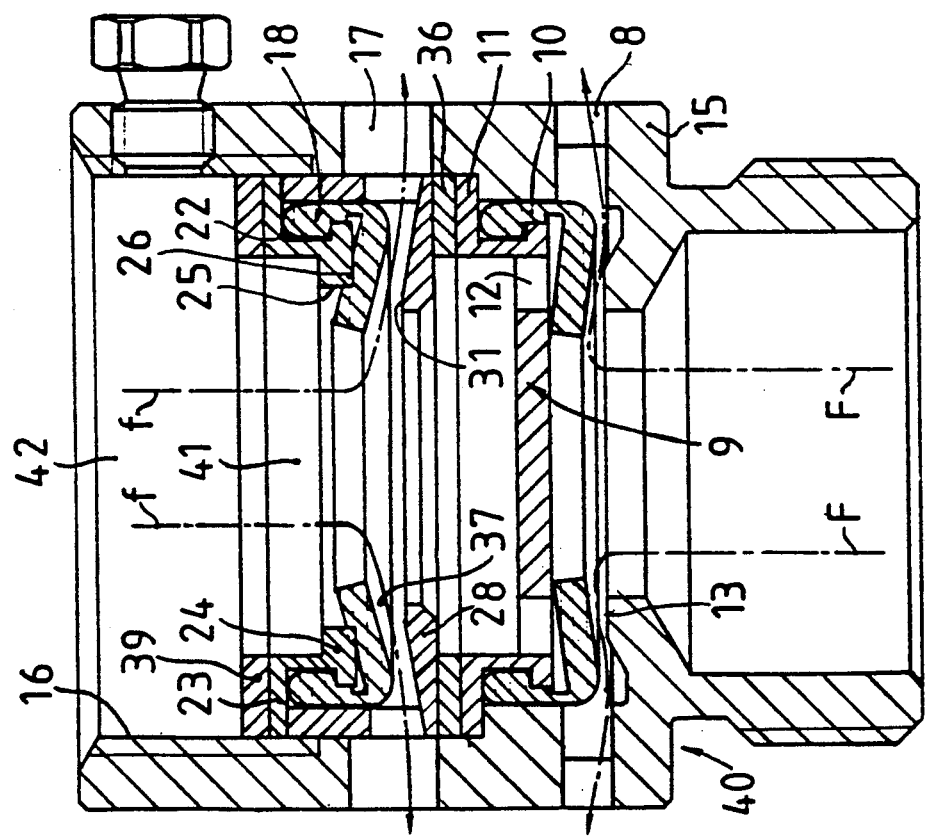

The valve 40 according to the invention, illustrated in FIGS. 2 and 3, has at the bottom a non-return valve structure which is similar, for example, to that illustrated in FIG. 1. According to the invention, in the body 15 of the valve, between the end 16, which can be connected to the mouth 5 of a tap 1, and the non-return valve assembly 9, a number of circumferentially distributed emptying ports 17 are advantageously made and an elastic shut-off diaphragm 18, for example made of rubber, is supported. In the example illustrated, the shut-off diaphragm 18 is similar to the non-return diaphragm 10 and has a structure in the form of an L or V with a tubular support leg 19 and an annular shut-off leg 20 which is movable contrary to the elasticity of the material of which it is made. The support leg 19 has a circumferential thickening 21 which is accommodated in a seat 22 made in an internal cup-type support 23. For rationality in construction and assembly, the internal cup-type support 23 is similar to the cup-type support 11 of the non-return valve 9. In the bottom 24 of the internal support 23, a large opening 25 with a lower stop edge 26 is provided. As can be seen in FIG. 2, with the tap 1 closed, the movable leg 20 bears against the stop edge 26. In the example illustrated, the shut-off diaphragm 18 is supported between the internal cup-type support 23 and an external cup-type support 27, the bottom 28 of which, FIG. 4, has a large central opening 29 with an upper striking edge 31 for the movable leg 20 of the elastic shut-off diaphragm 18. The cup-type supports 23 and 27 are concentric. The edges 24 and 28, between which the annular shut-off leg 20 of the diaphragm 18 extends, form an annular channel 37 which connects the internal chamber 42 of the valve body 15 to the external atmosphere through ports 32 made circumferentially in the jacket 30 of the external cup-type support 27, FIG. 4, and the emptying ports 17.

As can be seen from FIG. 2, in the absence of a delivered flow, that is to say with the tap closed, the annular movable leg 20 of the diaphragm 18 leaves the annular channel 37 free. Reference 39 indicates an annular gasket.

The non-return valve 40 according to the invention functions in the following manner: with the tap 1 closed, FIG. 2, the elastic diaphragm 10 of the non-return valve 9 closes the flow ports 12. Any return flow from the pipe downstream, not illustrated, in the direction of the arrows F would be discharged through the ports 8. The annular movable leg 20 of the shut-off diaphragm 18 bears against the bottom 24 of the internal support 23, as a result of which the water situated in the chamber 14 of the tap 1 can flow towards the outside through the annular channel 37, the radial ports 32 of the external cup-type support 27 and the emptying ports 17, as indicated by the arrows f. When the tap 1 is opened, the flow delivered pushes downwards the annular shut-off leg 20 of the gasket 18 against the stop shoulder 31 of the external cup-type member 27, preloading elastically the movable leg 20. The annular channel 37 is thus shut off and a discharge of the flow through the openings 17 is no longer possible. The flow delivered then passes through the openings 12 of the non-return valve and presses the elastic diaphragm 10 against the shoulder 13 and flows into the pipe downstream, not illustrated, FIG. 3.

The automatic discharge of the water contained in the chamber 14 of the tap 1 takes place, therefore, each time the tap 1 is closed, FIG. 2.

The alternative of FIGS. 5 and 6 differs from the design of FIGS. 2 and 3 only by virtue of the fact that a common cup-type support 34 is provided for the shut-off diaphragm 18 and the diaphragm 10 of the non-return valve. The cup-type support 34 is obtained by virtue of the fact that the external cup-type support 27 of the diaphragm 18 is prolonged downwards and forms in one single piece the internal cup-type support 11 of the non-return diaphragm 10. The functioning is identical to that described for the valve of FIGS. 2 and 3. Assembly is quicker and the intermediate gasket 36 is elliminated.

It falls within the scope of the invention to replace the non-return valve assembly 9 illustrated with a non-return valve assembly of different design, and also to provide structures of the shut-off diaphragm 18 and of the supports of the same which differ from those illustrated.

I claim:

1. A non-return valve for taps having an internal chamber, comprising:
   a valve body having an inlet communicating with the internal chamber of the tap, an outlet, and circumferential port means communicating with the outside of the valve body;
   a non-return valve assembly mounted in the valve body intermediate the inlet and the outlet and having an open position in which fluid flows from the tap internal chamber through the non-return valve assembly, and a closed position in which there is no flow therethrough; and
   a shut-off valve located between the inlet of the valve body and the non-return valve assembly for venting the internal chamber of the tap to the outside in the closed position of the non-return valve assembly, the shut-off valve including:
   support means located in the valve body and having circumferential opening means communicating with the circumferential port means, and a channel connecting the internal chamber of the tap with the circumferential opening means, and
   a resilient shut-off diaphragm supported in the support means and having an annular flange portion extending in the channel and movable between a first position in which it enables flow through the connecting channel and a second position in which it blocks flow through the connecting channel;
   the flange portion being movable from its first position into its second position by flow of the fluid upon opening of the non-return valve assembly, and being movable from its second position into its first position by a resilient force, upon closing of the non-return valve assembly, to enable venting of the fluid which remained in the tap internal chamber after closing of the non-return valve assembly, to the outside through the connecting channel.

2. A non-return valve as set forth in claim 1 wherein the support means includes a first cup-shaped support including an annular stop, and a second cup-shaped support including an annular collar arranged downstream of the annular stop, spaced therefrom and defining therewith the connecting channel.

3. A non-return valve as set forth in claim 2 wherein the resilient shut-off diaphragm is L-shaped, the first support has a seat for the diaphragm, and the second support has a jacket which forms with the seat of the first support a hollow space for receiving one leg of the L-shaped diaphragm, the other leg of the L-shaped diaphragm defining the flange portion which extends into the connecting channel between the annular stop and the annular collar and engages, in the first position thereof, the annular stop and, in the second position thereof, the annular collar.

4. A non-return valve as set forth in claim 1 wherein the non-return valve assembly includes a resilient L-shaped diaphragm and a cup-shaped support for supporting the same and formed as one piece with the second cup-shaped support.

5. A non-return valve for taps having an internal chamber for liquid comprising:
   a valve body having an inlet portion for connection to the tap and an outlet portion;
   first circumferential drain means for venting flow of liquid from the inlet portion of the valve body to the outside;
   second circumferential drain means for venting flow of liquid from the outlet portion of the valve body to the outside;
   a first elastically deformable diaphragm cooperating with said first drain means and having a relaxed condition in which said first drain means is open, and a deformed condition in which said first drain means is closed, said first diaphragm being moved to its deformed condition closing said first drain means in response to flow of fluid from the tap when the latter is open;

a flow-through passage means in the outlet portion of the valve body for controlling the flow of liquid through the valve body;

a second elastically deformable diaphragm cooperating with said second drain means and with said flow-through passage and closing said second drain means or closing said flow-through passage and opening said second drain means, said second diaphragm having a relaxed condition in which said second drain means is open and said flow-through passage is closed, and a deformed condition in which said second drain means is closed and said flow-through passage is open, said second diaphragm being moved to said deformed condition thereof by flow of liquid from the tap when the latter is open, and moving to its relaxed condition in response to cessation of a flow of liquid from the tap when the latter is closed;

whereby when the tap is closed liquid trapped in the internal chamber of the tap and in the valve upstream of said flow-through passage is drained out through said first drain means, and any returning liquid from downstream of said flow-through passage is drained out through said second drain means so that retention of liquid in the tap internal chamber or in the valve body is avoided.

* * * * *